United States Patent
Sack

[15] 3,638,755
[45] Feb. 1, 1972

[54] OUTER ENERGY ABSORBER FOR AIR-BAG-RESTRAINT SYSTEM

[72] Inventor: John J. Sack, Bloomfield Hills, Mich.

[73] Assignee: Allied Chemical Corporation, New York, N.Y.

[22] Filed: Dec. 14, 1970

[21] Appl. No.: 97,635

[52] U.S. Cl. ..................... 181/36 R, 181/33 C, 181/47 A, 280/150 AB
[51] Int. Cl. ................. F01n 1/22, B60r 21/02, B60r 21/08
[58] Field of Search .............. 280/150 AB; 181/33, 35, 36 R, 181/36.4, 47.1, 33.03

[56] References Cited

UNITED STATES PATENTS 3,473,824  10/1969  Carey et al. ................. 280/150 AB
3,476,402  11/1969  Wilfert ........................ 280/150 AB Primary Examiner—Robert S. Ward, Jr.
Attorney—Jonathan Plaut

[57] ABSTRACT

Energy absorption in a two-bag air bag combination, one bag contained within the other.

7 Claims, 4 Drawing Figures

PATENTED FEB 1 1972  3,638,755

INVENTOR
JOHN J. SACK
BY
Jonathan Plant
ATTORNEY

OUTER ENERGY ABSORBER FOR AIR-BAG-RESTRAINT SYSTEM

This invention relates to energy absorption in a passenger-restraint system as a result of the use of a two-bag combination, one bag contained within the other. More specifically this invention relates to the introduction of an energy-absorbing elastic bag outside of an air bag, the combination utilized to restrain forward motion of a passenger within a motor vehicle. Particularly, the energy-absorbing elastic barrier, which is smaller than the inner air bag when not stretched, acts to dissipate the total amount of energy of the fluid material which inflates the passenger-restraint air bag, and especially to reduce the sound level of inflation.

One of the principal problems in the inflation of passenger-restraining air bags by a generated gas or gas from a component gas source, or a combination of the two, is the audible sound caused by a rapid movement of the gas into the passenger restraint bag. The level of sound produced is not uniform in the prior art, as will be described hereinafter in detail, and such sound produced will peak at high and potentially unacceptable levels, such as in the range of 168–170 decibels.

It is, therefore, an object of this invention to provide for the absorption of the energy of the gas expanding an air-bag-restraint system, such that the total amount of energy produced for inflation of the air bag is dissipated over a period of time and the peak levels of sound pressure are reduced so that decibel level is lowered into an acceptable range. In addition, it is an object of this invention to absorb heat and smoke produced by the use of the inflatable gas medium and to allow for a redundancy advantage, as will be described in more detail hereinafter.

These and other objects and advantages will become more apparent in the context of the following more detailed description of the invention.

Generally, energy-absorbing means are provided as a part of a passenger-restraint bag, typically to be found within an automobile. The energy-absorbing means is in the form of an elastic smaller outer bag which contains the larger inner bag (larger when both bags are fully inflated but not stretched). The inner bag may be porous so that gas entering into it will be emitted into the outer bag; and it may also be stretchable. This energy absorbing, elastic outer bag barrier, due to its elastic quality expands to take the shape and meet the volume of the fully inflated inner bag. The absorption of that energy by the outer bag, as a result of its elastic movement under the pressure of the energy entering thereinto dissipates the total amount of said energy over a period of time and reduces the peak decibel level of said energy. When the energy of the inflating material is directed against the wall of the inner bag and then the stretching outer bag when the larger inner bag reaches the volume of the unstretched outer bag, the energy wave breaks up. This results in a lowering of the peak decibel range of the system.

In addition, the initial energy absorption barrier, in the form of the inner bag, contains heat and smoke, where they exist, of the inflating medium and provides a redundancy advantage in that if said initial barrier should fail, the outer bag would still function to provide passenger restraint.

The U.S. Pat. to Carey et al., No. 3,473,824 discloses a system with inner barrier and outer bag arrangement for absorption of kinetic energy of the inflating medium. However, among other differences, the outer barrier is not disclosed as smaller and stretchable to take the shape of the inner bag and stretch with it and dissipate over a period of time the energy of the inflating medium, resulting in the peak sound reduction desired, but rather in Carey et al., the inner barrier merely unfolds and then bursts or otherwise emits the inflating medium into the outer bag.

Describing in further detail in relation to the drawings.

Figure 1A:
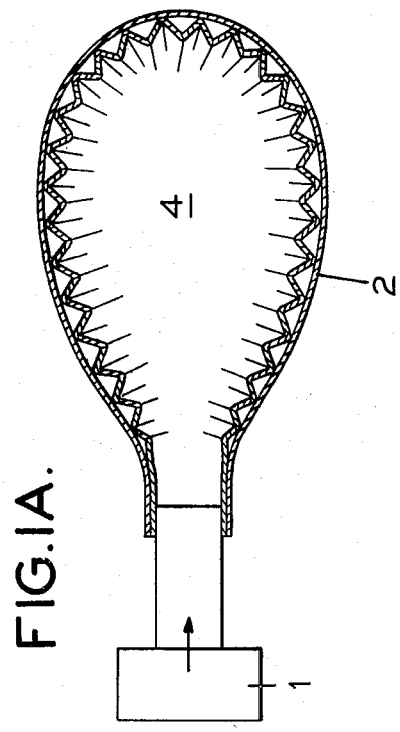
FIG. 1A shows the embodiment to the invention, partially expanded.
Figure 1:
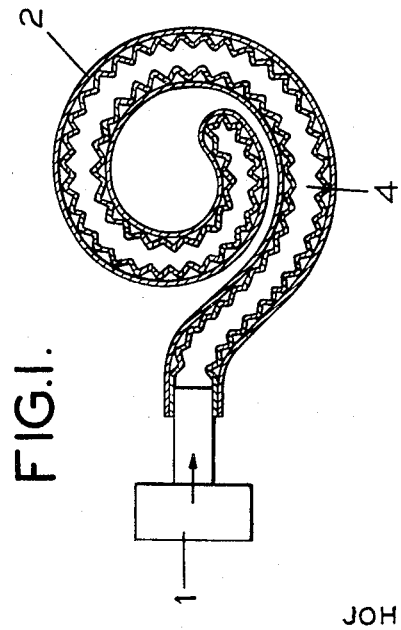
FIG. 1 shows the embodiment of the invention with an inner bag located within the energy-absorbing elastic outer bag, both unexpanded.

According to the invention, an inflating medium is obtained from a source 1, as is well known in the art. For example, the inflating medium is gas obtained from either a gas-generator system or a compressed gas source, or a combination of the two. The inflating medium is directed at least partially, into an inner bag 4. In the embodiment of FIG. 1, the inflating means is directed into an inner bag 4, said inner bag being contained within an outer elastic passenger restraint bag 2. In the embodiment shown in FIG. 1, 1A, 2 and 3 all of the inflating material is directed into the inner bag, but in the alternate only a portion of the inflating material may be directed into the inner bag, the rest of the inflating material entering directly into the outer bag.

In this embodiment, the outer bag is in one embodiment preferably knit and made, for example, of nylon or polyester material. Other materials may also be utilized. The inner bag is preferably elastic, although it may be less so than the outer bag, and may, for example, be woven. The knitting and weaving operations, of course, are known and not the object of this invention. The outer bag of one embodiment may stretch on filling in the range of at least 50–100 percent of its original volume and thus absorb the energy of the inflating material entering into the inner bag, which on filling has reached the volume of the outer bag and is pushing thereagainst. The elasticity of the outer bag serves to dissipate the total amount of energy of the gas over a period of time, reducing the peak sound level of said energy. The outer elastic bag will move in a direction so as to conform to the shape of the inner bag as it expands with it, after said inner bag first moves into the partially expanded position of FIG. 1A from the folded position of FIG. 1. The inner bag on inflation will contain heat and smoke which may accompany the inflating material. In an alternative embodiment, the inner bag may be stretchable too, over its original inflatable volume, so that both bags will so function to dissipate the energy of the inflating medium.

In the case of a knitted outer bag, as the bag expands the spaces between the knitted material will open and movement of inflating material therethrough will occur. Provision for spaces in the inner bag for fluid flow from the inner bag to the outer bag is also desirable.

Figure 2:
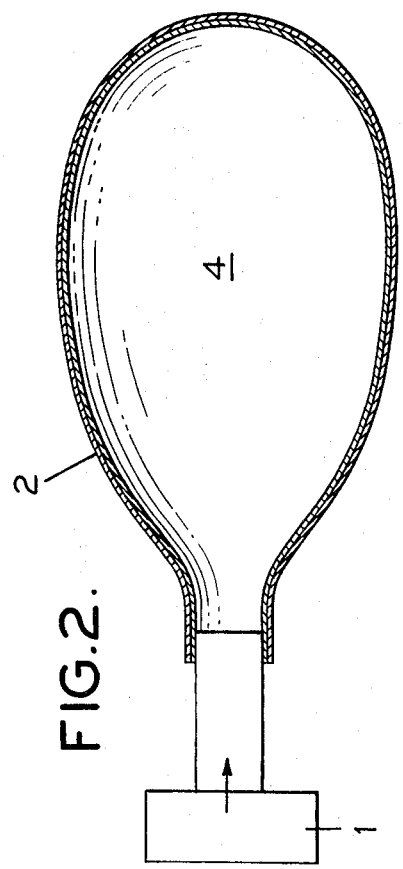
FIG. 2 is a second view of the invention with both the bags expanded.
Figure 3:
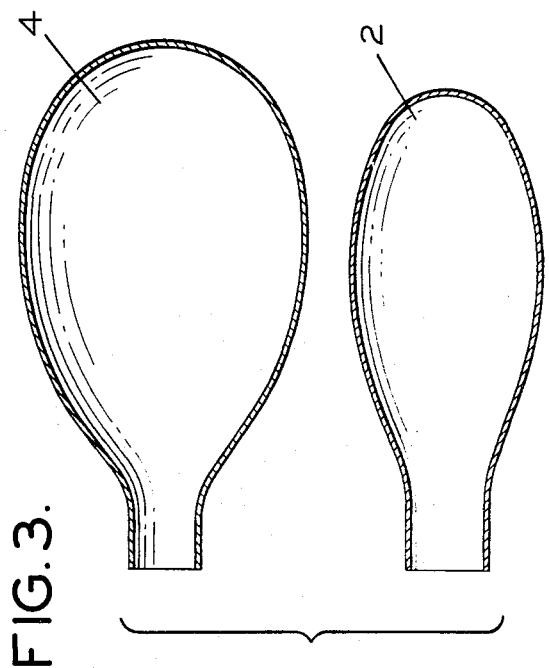
FIG. 3 shows the two bags before one is inserted into the other.

In FIG. 2, the expanded inner bag 4 is against and pushing on the energy absorber, elastic outer bag. The expandable elastic bag 2 furnishes energy absorption, in that it stretches as a result of the pressure of the energy of the inflating material, in one embodiment to at least about 50–100 percent its original size, and dissipates that energy over a period of time.

The result employing an energy absorber in the form of an expandable elastic outer bag of, say in one embodiment, 6 cubic feet when expanded but not stretched with an 8 cubic foot (when expanded but not stretched) inner bag therein, is that when filling of the bags is complete within about 40 millisecs, the inner bag then being fully inflated, the total amount of energy of the inflating material is dissipated over a period of time and the maximum decibel range is 155–157 decibels, which is the equivalent of 21,500 dynes/sq. cm. The sound level in decibels produced by movement of the inflating medium directly into a single bag, in the same time, is about between 168–170 decibels, which is equivalent to about 54,512 dynes/sq. cm. The reduction in sound level is significant.

Of course, this invention is not concerned with the use of a lower torso restraint, which also may be employed within the outer bag as a matter of choice.

Although the invention has been described with relation to two embodiments, it is understood that the intention is that it only be limited by the scope of the following claims and not the details of the apparatus, materials, or methods of employing them as recited above.

I claim:

1. Air-bag-restraint system comprising an energy-absorbing elastic outer bag, an inner bag located in said outer bag and larger than said outer bag, by volume, when both are inflated but not stretched, means for introducing inflating gas into said inner bag, said inner barrier conforming to the shape of said outer bag when said gas is introduced thereinto and stretching said outer bag as it expands.

2. Air-bag-restraint system of claim 1, said elastic bag being woven.

3. Air-bag-restraint system of claim 2, said inner bag also being stretchable over its original inflated volume.

4. Air-bag-restraint system of claim 3, said bags being formed of nylon.

5. Air-bag-restraint system comprising an elastic energy absorbing outer bag, an inner bag located in said outer bag and larger than said outer bag, by volume, when both are inflated but not stretched, means for introducing gas into said inner bag to fill it without bursting, said inner bag conforming to the shape of said outer bag when said gas is introduced thereto and stretching said outer bag as it expands, said outer bag being woven, said inner and outer bags having openings therein for passing the inflating gas therethrough on filling, and said outer bag being stretchable on filling in the range of at least 50 to 100 percent of its original volume.

6. Method of lowering the sound level of the inflation of an air bag inflated by gas introduced thereinto, comprising expanding said air bag against an energy-absorbing stretchable barrier outside of said bag.

7. Method of claim 6, said barrier being a knit outer bag surrounding said inner bag.

* * * * *